No. 640,740. Patented Jan. 9, 1900.
S. T. BRALEY.
WEIGHING SCALE.
(Application filed July 28, 1899.)
(No Model.) 2 Sheets—Sheet 1.
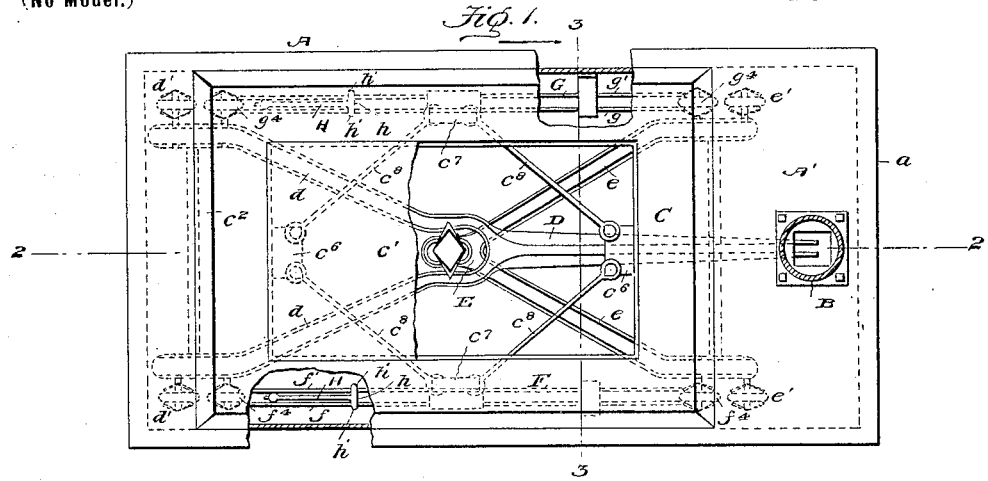
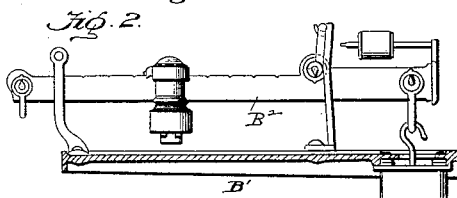
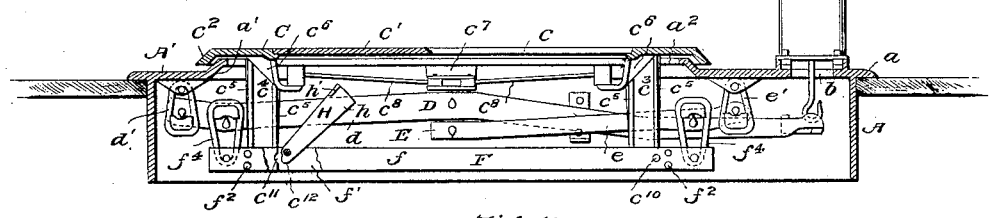
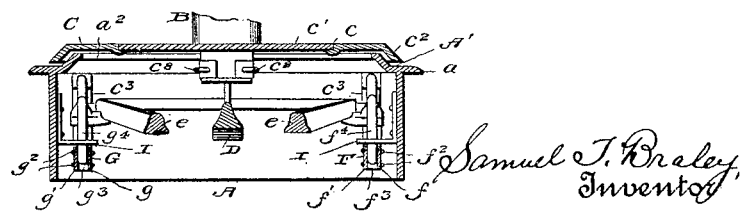

No. 640,740. Patented Jan. 9, 1900.
S. T. BRALEY.
WEIGHING SCALE.
(Application filed July 28, 1899.)
(No Model.) 2 Sheets—Sheet 2.
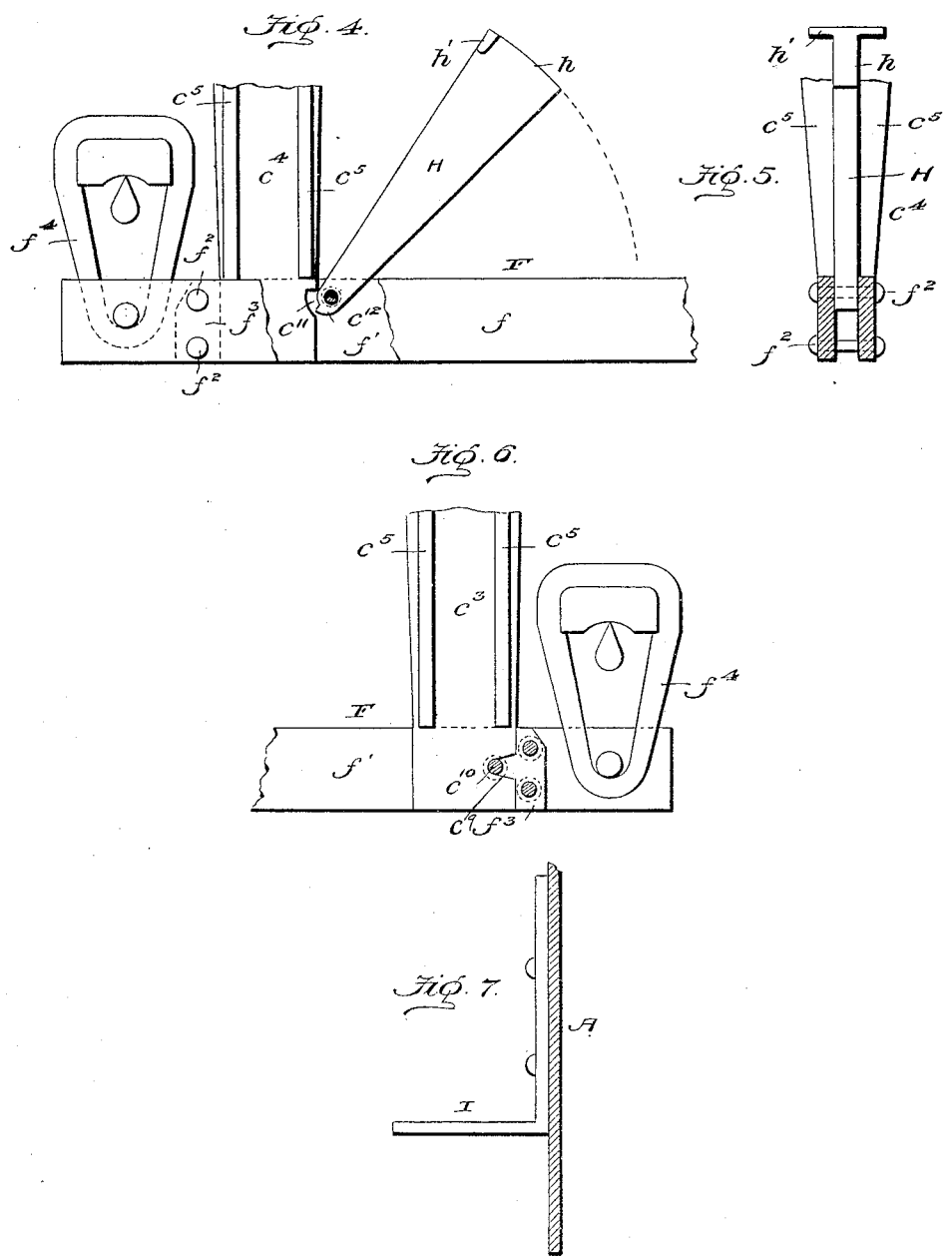
Samuel T. Braley,
Inventor
Witnesses
By Clifford S. Walton
his Attorney

UNITED STATES PATENT OFFICE.

SAMUEL T. BRALEY, OF RUTLAND, VERMONT, ASSIGNOR TO THE HOWE SCALE COMPANY OF 1886, OF VERMONT.

WEIGHING-SCALE.

SPECIFICATION forming part of Letters Patent No. 640,740, dated January 9, 1900.

Application filed July 28, 1899. Serial No. 725,439. (No model.)

*To all whom it may concern:*

Be it known that I, SAMUEL T. BRALEY, a citizen of the United States, residing at Rutland, in the county of Rutland and State of Vermont, have invented certain new and useful Improvements in Weighing-Scales; and I do hereby declare the following to be a full, clear, and exact description of the invention, such as will enable others skilled in the art to which it appertains to make and use the same.

My invention relates to improvements in platform-scales; and one of the objects of the same is to provide means for holding the platform securely in position while in use to prevent disarrangement of the weighing mechanism of the scale.

Another object of the invention is to provide a platform which is removable independently of the weighing mechanism and which is automatically locked to the same when placed in position.

Still another object is to prevent the suspended frame of the weighing mechanism from tipping up at the side opposite to that where the load is when the latter is placed on the extreme edge of the platform.

The invention has for a further object the prevention of the entrance of dirt and solid objects between the main frame and the platform and accumulation on the elements of the weighing mechanism.

As an object supplementary to the second one set forth above, the construction of the platform so that it is removable independently of any weighing parts and automatically attachable to the same permits easy access to the interior of the scale, so that it can be easily cleaned without disturbing the arrangement of the weighing mechanism. This is of great importance in flour-mills and grain-elevators, where it becomes necessary to clean out the scales several times during the day.

With these and other objects and advantages in view the invention consists of the novel and useful construction and arrangement of parts hereinafter described, and particularly pointed out in the claims hereto appended.

In the drawings accompanying this specification and forming a part hereof, Figure 1 is a plan view of my improved platform-scale with parts broken away to more clearly show other constructions. Fig. 2 is a longitudinal sectional view of the same on the line 2 2 of Fig. 1. Fig. 3 is a transverse sectional view of the same on the line 3 3 of Fig. 1. Figs. 4 and 5 are details of rear locking-cam and suspended frame. Fig 6 is a detail view of the front end of the suspended frame, with the leg in place. Fig. 7 is a detail view of the stop.

Like letters of reference denote like parts throughout all of the figures of the drawings.

The frame A, which is rectangular in shape, houses the weighing mechanism and is provided with a surrounding flange $a$, which projects outwardly from the top of the said frame and serves to support it when set in the floor, as clearly seen in Fig. 2 of the drawings. It is also provided with a top A', of which the surrounding flange $a$ may be said to form a part, and said top has a rectangular opening $a^2$, permitting access to the weighing mechanism. This opening is formed with its edge upturned, as at $a'$, to form a ledge or flange which coöperates with a downturned ledge or flange on the scale-platform to prevent dirt, dust, and solid sweepings from entering the opening $a^2$ and accumulating upon the several parts of the weighing mechanism. Bolted to the top of the frame A is the pillar B, which may be of any ordinary or preferred construction, and this pillar supports the scale-beam B', which is connected to the weighing mechanism through the opening $b$ and by any suitable means.

The scale-platform C is rectangular in shape and is formed with a rectangular opening $c$, covered by a removable panel $c'$, so that access may be had to the mechanism beneath by simply lifting it. This platform is surrounded by a downturned flange or ledge $c^2$, which overhangs the flange $a'$ on the top of the frame A and coöperates with the same, as before described, to prevent the entrance of dirt, dust, or solid sweepings. Depending from each corner of the platform is a leg. Those at the front I will designate as $c^3$, while those at the rear may be designated as $c^4$. These legs are formed with laterally-projecting flanges $c^5$, for a purpose hereinafter described, and in cross-section they resemble channel or I beams. The flanges stop some distance short of the ends of the legs. Depending from the front and rear edges of the opening $c$ in the platform and from the same some distance back from the sides of said opening are two end steps or hangers $c^6$ $c^6$ and two lateral ones $c^7$ $c^7$. Connecting each of such hangers is a series of braces or rods $c^8$.

Within the frame A are the scale-levers D and E, which are forked, thus forming on the lever D the arms $d$ $d$ and on the lever E the arms $e$ $e$, all of which are suspended from the under surface of the frame A by suitable pivotal connection with the links $d'$ $d'$ and $e'$ $e'$. The stem of the lever E is pivotally connected with the lever D approximately at the center of the scale-platform, and the stem of the latter lever is likewise connected with the scale-beam support $B^2$. Beneath the said scale-levers and located adjacent to the sides of the frame A and directly underlying the legs depending from the scale-platform are two suspended frames F and G. These frames are composed of two parallel bars $f$ $f'$ and $g$ $g'$, suitably connected or secured together by bolts $f^2$ $g^2$ and spacing-blocks $f^3$ $g^3$, and said frames are suspended each from a branch $d$ and a branch $e$ of the scale-levers by means of the links $f^4$ $g^4$, connected with the suspended frames by transverse bolts and to the lever branches by knife-edge pivots similar to all of the pivotal connections herein employed.

When the platform is in position, the legs on each side pass between the two bars forming each suspended frame, and the legs $c^3$ at the front of the scale have U-shaped notches $c^9$ cut in the front edges thereof, which engage with transverse bolts $c^{10}$ in each of the suspended frames F and G contiguous to the front spacing-blocks, against which the legs abut when in position. The rear legs $c^4$ are notched at $c^{11}$, as shown in Fig. 4, to engage with a shoulder $c^{12}$ on a pivoted locking-cam H, employed on each suspended frame. This cam has a weighted end $h$, which retains it normally in a down position and securely locks the end of the leg against the rear spacing-blocks. The weighted end of the cams is provided with lateral projections $h'$, which prevent the same from falling down between the bars of the suspended frames. When the front and rear legs are locked to the suspended frames in this manner, the side flanges thereon rest on the upper edges of the frame-bars, making movement at these joints impossible. When the parts are in this relation to each other, it will readily be observed that a weight rolled upon the rear of the scale-platform would throw the opposite ends of the suspended frames F and G upward, and to prevent this and limit such movement I employ the stops I, which are angular pieces bolted or riveted to the insides of the frame A near the front of the platform, with an arm projecting over the adjacent suspended frames and a slight distance above same.

When it is desired to remove the platform for any purpose, the panel therein may be lifted, the cams raised, and the legs disengaged from the suspended frames by a slight rearward movement of the platform, and then the latter may be freed. To place it in position again, the operation may be reversed.

From the foregoing description the operation of my invention will be clear, and further explanation is not deemed necessary.

I do not desire to limit myself to the precise details of construction nor to the precise arrangement of parts herein shown and described, but reserve to myself the right and privilege to alter the same within the bounds of mechanical ingenuity without departing from the spirit of my invention.

Having thus fully described my invention, what I claim as new, and desire to secure by Letters Patent, is—

1. In weighing-scales of the class described, the combination with a stationary frame, scale-levers suspended therefrom, and a scale-beam connected with said levers, of frames suspended from said levers, automatic locking devices on each of said suspended frames, and a weighing or scale platform having depending legs removably engaging with said locking devices.

2. In weighing-scales of the class described, the combination with a stationary frame, scale-levers suitably suspended therefrom, and a scale-beam connected with said levers, of frames suspended from said levers, automatic locking devices on said suspended frames, a scale-platform provided with depending legs removably engaging with said locking devices, and means for limiting the upward movement of said platform.

3. In weighing-scales of the class described, the combination with a stationary frame having an opening in the top thereof, of weighing mechanism including a weighing-platform, a suspended frame, said platform having a depending flange which overhangs an upwardly-projecting flange surrounding the opening in the top of the stationary frame to form a dust-guard, and an automatic locking device consisting of notched front legs of said platform to engage pins on the front end of the suspended frame, and cams attached to the rear end of the suspended frame to engage shoulders on the rear legs of the platform.

4. In weighing-scales of the class described, the combination of a stationary frame, scale-levers and a scale-beam suitably connected therewith, a scale-platform provided with depending legs engaging with frames composed of two parallel bars suitably spaced apart, and suspended at their ends from separate scale-levers, a transverse pin or bolt in the front of each suspended frame, to engage with a notch in the front legs of the platform, and cams in the rear of each of said frames, provided with shoulders to engage automatically with notches in the rear platform-legs, whereby all of said legs may be locked securely in place and the platform connected to the suspended frames.

In testimony whereof I affix my signature in presence of two witnesses.

SAMUEL T. BRALEY.

Witnesses:
WILLIAM H. FLANIGAN, Jr.,
CARL B. HINSMAN.